3,047,357
METHOD FOR PREVENTING DRY ROT IN TIMBER ASSOCIATED WITH MASONRY
Gerald Gobert, 48 Meadway Court, Meadway,
London, England
No Drawing. Filed Dec. 10, 1958, Ser. No. 779,282
Claims priority, application Great Britain Dec. 11, 1957
5 Claims. (Cl. 21—7)

This invention concerns improvements in or relating to the prevention and cure of fungal and insect infections and to the destruction of pests, in timber associated with masonry.

More particularly this invention relates to the prevention and cure of fungal infections and to the destruction of pests which are present in damp surroundings in brickwork, concrete, stonework and like materials (all hereinafter for the sake of convenience called "masonry") and timber. This invention is especially concerned with the prevention and cure of such infections as "dry rot" which is a condition caused by infection by the fungus, *Merulius lacrimans*.

Heretofore the normal treatment of buildings and the like infested with dry rot has been to strip out and burn the infested timber and then to scorch by means of a blow lamp or other suitable source of heat the masonry which is infested with the hyphae and spores of the fungus, subsequently replacing the removed timber with new timber. However, this method only treats the surface of the masonry and the hyphae and spores may lie deep therewithin so that, after the timber has been replaced, a fresh attack of dry rot develops. It has therefore sometimes been the practice to impregnate the masonry with a fungicide by injecting a solution of the latter under pressure into the masonry. Unfortunately, however, dry rot is, in spite of its name, caused by damp and soaking the masonry with an excessive aqueous solution of the fungicide (usually a fluoride) will merely aggravate the damp condition, and the fungicide will be diluted by the damp present in the masonry with the result that effective treatment is rarely, if ever, achieved. Moreover this treatment hinders subsequent redecoration of the masonry.

For a considerable period of time, I have been carrying out experiments in order to devise a more suitable method for treating wood associated with brickwork or the like to prevent infestation with dry rot and similar fungal infections and/or with pests and I have come to the conclusion that the prior methods were fundamentally wrong in their use of blow lamps and injection of an aqueous solution of the fungicidal compounds and in particular in the use of sodium fluoride which has been known to be neutralized by even old mortar.

The masonry, because of its porous nature, defines a path along which moisture is inherently conveyed to the timber associated therewith. By the insertion of a mixture of a wetting agent and a dry rot inhibiting composition in a cavity located in this path, the moisture reaching the timber has fungicidal properties and dry rot is prevented.

According to the invention therefore I provide a plug for use in combating (which term as used herein covers preventing and/or curing and/or destroying) infections and pests in timber associated with masonry, tubes and the like, such plug comprising a suitable fungicidal and/or pesticidal (hereinafter all called "fungicidal") compound.

Preferably the plug also includes a wetting and spreading agent in order to assist the distribution of the said fungicidal compound. Thus a wetting agent may be incorporated in the plug in order to reduce the surface tension of the damp present in the masonry, timber or the like and so as to ensure that the fungicidal compound will be distributed by any rising or inherent damp in such masonry, timber or the like. The wetting agent may be an ionic or non-ionic surface active compound, for example a long chain alkyl sulphate, an alkyl-benzene sulphonate, a quaternary ammonium compound or a polyoxyalkylene ether compound.

According to a further feature of the invention, the plugs may also include a solubility increasing agent, such as a hygroscopic salt, e.g. calcium chloride.

Desirably the plugs are compressed and concentrated so as to contain the maximum quantity of the fungicidal compound. Conveniently they are compressed after blending with or without a hardener, for example 4 to 5% sodium chloride.

In applying this invention to new houses as a preventative against dry rot, the plugs of fungicidal compound may be incorporated in the masonry during construction at locations near timber where damp conditions are likely to cause wood rot, for example behind sinks, wash-basins, baths, lavatory cisterns, exterior drains and the like.

By inserting the plugs into cavities formed in the masonry, all moisture on which dry rot can feed and spread to timber is poisoned. Dry rot, feeding on a reservoir of moisture, can spread its roots through or over inert substances for many feet in search of timber to attack. Use of the plugs of the invention poisons the source of moisture and thus protection is given not only to timbers in actual contact with damp masonry but also to timber many feet away from the plugs.

The invention appears more likely to be of importance in the treatment of dry rot in older buildings as most modern buildings are provided with cavity walls and damp-proof courses which effectively reduce the danger of dampness on the interior walls.

However, the life of many of these damp-proof courses is limited as they may break down or, through carelessness, they may be bridged either internally or externally thus allowing the damp to rise which may set up rot conditions. As an extra precaution therefore in new houses, it is desirable to incorporate the plug of the invention in the damp-proof course (vapor barrier).

In treating existing masonry I prefer to drill the walls at frequent intervals to a depth of 4 inches and insert a plug of fungicidal compound of a similar diameter as the drill. The holes in the walls may be left open, or may be concealed behind woodwork such as (baseboards) skirtings. Thus the holes into which the plugs are to be inserted may be made longer than the plugs themselves in order that the plugs may be inserted into the body of the material being treated and, once having been inserted, may be retained in position by sealing means, for example a closure member. The drilling of the masonry may conveniently be carried out by means of a diamond tipped or durium tipped drill, say 3/8" in diameter. An advantage of the invention resides in the fact that, when painted masonry, timber or the like is being treated, it is unnecessary to remove all the paint therefrom before inserting the plugs since, once the plugs have been inserted, the fungicidal compound diffuses by osmosis into the material underlying the paint, using for this purpose the moisture inherent in the masonry.

Although it is often desirable to have fungicidal compounds diffusing through a building or the like to set up a large effective area in which fungi and other pests are destroyed, nevertheless it is often advantageous to limit the degree of travel of the fungicidal compound, particularly where it may have a detrimental effect on a coating of paint or the like, or on metals in, or in contact with, the material being treated.

It is a further object of this invention to provide means for combating fungicidal infections and pests which means are particularly suitable in those conditions where it is desired to limit the degree of travel of the fungicidal compound.

Thus, according to a further aspect of this invention, there is provided a method of combating fungicidal infections and pests in timber associated with masonry, such method comprising inserting in cavities formed in the masonry, a fungicidal compound and a fixing agent, the said fungicidal compound and fixing agent being water-soluble and reacting together in the presence of moisture to give a relatively water-insoluble compound.

By the term "fixing agent" as used herein is meant a chemical compound or substance which is adapted to react with the said fungicidal compound when in use to give a composition which is relatively insoluble in water but which is effective to prevent and/or cure fungal infections and/or to destroy pests.

According to a further feature of the invention, the said fungicidal compound and fixing agent may be provided in plug form.

Thus, if desired, the said fungicidal compound and fixing agent may be formed in a single plug for insertion into the masonry, a series of such plugs conveniently being arranged at spaced intervals therein.

Alternatively the fungicidal compound may be provided in a separate plug from the fixing agent. Thus, according to a still further aspect of this invention, there is provided a method of combating fungal infections and pests in timber associated with masonry, such method comprising inserting in spaced relationship in such masonry, a plug containing a suitable fungicidal compound and a separate plug containing a fixing agent, the plugs being so arranged and the said fungicidal compound and fixing agent being so chosen that the fungicidal compound and fixing agent diffuse into the surrounding masonry, timber or the like and, where they meet, form a relatively water-insoluble composition which is soluble in the digestive juices of the fungi and/or the pests and destroys them.

Conveniently the said fixing agent also has fungical and/or pesticidal properties of its own; it may be a copper salt such as, for example, copper sulphate or copper acetate. If desired, a mixture of two or more fixing agents may be used.

Examples of the said fungicidal compound are the sodium, potassium, ammonium or amine derivative of pentachlorophenol, and the chromates, bichromates and other salts of sodium, potassium or ammonia. Other examples are the alkali metal salts of ortho-phenyl-phenol, e.g. sodium ortho-phenyl-phenate, and mercury and fluoride salts, e.g. mercuric chloride, sodium fluoride and sodium and magnesium silico-fluoride. Moreover a mixture of two or more fungicidal compounds may be used.

In addition, an alkali metal salt or an ammonium or amine salt of benzoic or substituted benzoic acid may be incorporated to facilitate diffusion into the masonry, timber or the like.

If desired the plugs may contain fillers and binders; these are preferably, but not necessarily, gum compounds. Examples of other fillers and binders which may be used are sodium sulphate, sodium carbonate and starch.

When the plugs of the invention contain a fixing agent, they are especially suitable for use in very damp conditions, the diffusion of the fungicidal compound and fixing agent being restricted because they combine with each other so that they do not become too diluted and so that the toxic limit of the fungi and/or pests therein is not passed.

The plugs may be in any suitable form but are conveniently tabletted or alternatively extruded in rod-like form. They may be made in a size ready for use or, for example, extruded in long lengths and subsequently cut to the required shorter length.

Advantageously and in order to ensure that the plug has maximum contact with the masonry, the plug is formed in two or more parts suitably shaped according to the hole in which it is to be inserted so that, after being placed in a hole in the masonry, the two parts separate and give the greatest contact possible over the material surrounding the hole. Thus, when the plugs are to be inserted in a hole of circular cross-section they are conveniently formed so as to be cylindrical but divided longitudinally to form two portions of half-round cross section.

In order to minimise any adverse effect to persons handling the plugs, they may be capsulated or coated, for example by dipping in gelatine or may be otherwise covered or cartoned to prevent prolonged contact with the skin.

In order that the invention may be more readily understood several examples of the plugs and methods of the invention will be described by way of example.

The first embodiment of the invention to be described shows the invention applied in a typical case, where a house has no damp-proof course and the skirting is infested with dry rot due to damp rising from the foundation.

In this embodiment, the infested skirting is removed and is soaked with a wood preservative, e.g. based on chlorinated naphthalene, orthophenylphenol or pentachlorphenol, in order to stop fungal infestation. The exposed brickwork is sprayed with aqueous fungicide e.g. a 5% solution of sodium orthophenylphenate or a 5% solution of sodium pentachlorphenate, and brushed with a wire brush in order to remove fungus present on the surface and is then sprayed again to sterilise the surface and set up a chemical barrier.

The brickwork is then drilled 4" deep with a ⅜" drill at 8" intervals and conveniently in a diamond pattern, and fungicidal plugs according to the invention are inserted in the bores, each of these plugs conveniently being 4" long and ⅜" in diameter and each containing approximately 210 grains of concentrated fungicide which is equal to 3 pints of fungicidal liquid.

Thus, each plug may have the following composition:

| | Percent |
|---|---|
| Fungicidal compound, e.g. sodium pentachlorphenate | 86 |
| Sodium chloride | 4 |
| Wetting agent | 5 |
| Hygroscopic salt, e.g. calcium chloride | 5 |

The plug is made by blending together the constituents and then compressing them. Thus, for example, the plugs may be made on tabletting or extruding machines, or the water borne salts may be heated and run into moulds.

The bores filled by the plugs may be left open, or covered by the skirting, the skirting and surrounding timbers desirably being treated with an organic solvent type wood preservative (e.g. based on chlorinated naphthalene, orthophenylphenol or pentachlorphenol) before being fixed in place. It will be appreciated that decorations need not be delayed and will not be spoilt by this treatment for the treated area of brickwork will not have been made unduly damp. Of course, it is desirable to rectify the source of damp, if possible, and to provide for increased ventilation.

In the second example to be described two sets of plugs are provided, the first set or group A comprising the following compounds:

| Group A: | Percent |
|---|---|
| Copper sulphate ⎱ fixing agent | ⎱ 80 |
| Copper acetate ⎰ | ⎰ 8 |
| Starch | 5 |
| Common salt | 6 |
| Wetting agent | 1 |

The second set or group B is made up as follows:

| Group B: | Percent |
|---|---|
| Sodium pentachlorophenate (fungicidal and pesticidial compound) | 98 |
| Salt | 2 |

The plugs are made by blending together the constituents and then compressing them. They are conveniently tabletted in two halves which are subsequently packed in a cardboard cartridge comprising a tube releasably closed at each of its ends by a cap. The plugs should be stored in a dry place.

In use the plugs are inserted alternately at regular intervals into holes in the masonry, such holes conveniently being formed by drilling. Each plug is readily inserted by removing the caps from the cardboard cartridge, holding the tube containing the plug close to the material being treated and with its axis at right angles thereto and, with a thin stick, pencil or the like, pushing the plug out of the cartridge and into the hole. This method has the advantage that the plug does not come into direct contact with the user.

Since both the fungicidal and pesticidal compound and the fixing agent are water soluble, they will travel in use, the travel of the fixing agent being assisted by the wetting agent.

Where the fungicidal and pesticidal compound and the fixing agent meet, they form the fresh- and sea-water-insoluble composition, copper pentachlorophenate, which is however soluble in the digestive juices of fungi.

In the third and fourth examples to be described, the fungicidal compound and fixing agent are formed in single plugs for insertion into the masonry.

In the third example, each plug has the following composition:

| | Percent |
|---|---|
| Copper sulphate ($CuSO_4.5H_2O$) | 44 |
| Sodium bichromate ($Na_2Cr_2O_7.7H_2O$) | 43 |
| Sodium chloride | 5 |
| Sodium stearate | 3 |
| Starch | Balance |

In the fourth example, each plug has the following composition:

| | Percent |
|---|---|
| Copper sulphate ($CuSO_4.5H_2O$) | 20 |
| Sodium pentachlorophenate | 25 |
| Tetrasodium pyrophosphate | 50 |
| Sodium stearate | 4 |
| Sodium chloride | Balance |

In the above described embodiments, the plugs are inserted into the brickwork or the like in solid form. Alternatively, for example, the fungicidal and/or pesticidal compounds and/or the fixing agent may be injected into the holes in the brickwork or the like as a highly viscous solution, emulsion or suspension, which subsequently sets or solidifies. A manually, mechanically or pneumatically operated syringe-type injector gun may be used for this purpose.

I claim:

1. The method of preventing dry rot in timber associated with masonry, said masonry defining a path along which moisture is inherently conveyed to said timber, said method comprising the steps of forming at least one cavity in said masonry, said cavity being located in said path, and inserting in said cavity a water-soluble mixture of a wetting agent and a dry rot inhibiting composition.

2. The method according to claim 1, wherein said mixture is in the form of a bipartite plug one part of which consists essentially of 80% copper sulphate, 8% copper acetate, 5% starch, 6% common salt and 1% wetting agent, the other part consisting essentially of 98% sodium pentachlorophenate and 2% salt.

3. The method according to claim 1, comprising the further step of forming said mixture into a plug, said plug being inserted in said cavity.

4. The method according to claim 1, comprising the further step of disposing a water-soluble fixing agent in said path, said fixing agent being adapted to react with said inhibiting composition to form a fungicidal compound which is less soluble in water than said inhibiting composition.

5. The method of preventing dry rot in timber associated with masonry, said masonry defining a path along which moisture is inherently conveyed to said timber, said method comprising the steps of forming a series of cavities in said masonry, all of said cavities being located in said path, inserting in alternate holes of said series a mixture of a wetting agent and a water-soluble dry rot inhibiting composition, and inserting in the cavities intermediate said alternate cavities a water-soluble fixing agent which reacts in said path with said inhibiting composition to form a fungicidal composition which is less soluble in water than said inhibiting composition.

References Cited in the file of this patent

UNITED STATES PATENTS

| 1,999,458 | Hossister | Apr. 30, 1935 |
| 2,062,081 | Zwingaver | Nov. 24, 1936 |
| 2,282,290 | Swales | May 5, 1942 |
| 2,430,017 | Houk | Nov. 4, 1947 |

FOREIGN PATENTS

| 765,341 | Great Britain | Jan. 9, 1957 |